(12) United States Patent
Takahashi

(10) Patent No.: US 11,874,385 B2
(45) Date of Patent: Jan. 16, 2024

(54) MEASURING CIRCUIT, MEASURING DEVICE, AND PROGRAM

(71) Applicant: SONY SEMICONDUCTOR SOLUTIONS CORPORATION, Kanagawa (JP)

(72) Inventor: Tomoyuki Takahashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 426 days.

(21) Appl. No.: 17/250,631

(22) PCT Filed: Aug. 16, 2019

(86) PCT No.: PCT/JP2019/032145
§ 371 (c)(1),
(2) Date: Feb. 12, 2021

(87) PCT Pub. No.: WO2020/040053
PCT Pub. Date: Feb. 27, 2020

(65) Prior Publication Data
US 2021/0311157 A1 Oct. 7, 2021

(30) Foreign Application Priority Data
Aug. 23, 2018 (JP) .................. 2018-156422

(51) Int. Cl.
*G01S 3/28* (2006.01)
*G01S 19/53* (2010.01)
*H01Q 9/04* (2006.01)

(52) U.S. Cl.
CPC ............... *G01S 3/28* (2013.01); *G01S 19/53* (2013.01); *H01Q 9/0407* (2013.01)

(58) Field of Classification Search
CPC .......... G01S 3/28; G01S 19/53; H01Q 9/0407
(Continued)

(56) References Cited

U.S. PATENT DOCUMENTS 11,699,838 B2 * 7/2023 Burdick ............... H01Q 1/1257
342/359
2019/0067812 A1 * 2/2019 Abuasabeh ......... G06F 3/04812

FOREIGN PATENT DOCUMENTS

GB 2463703 A * 3/2010 ............. G01S 19/14
JP 11-231038 A 8/1999
(Continued)

OTHER PUBLICATIONS

International Search Report and Written Opinion of PCT Application No. PCT/JP2019/032145, dated Nov. 5, 2019, 07 pages of ISRWO.

*Primary Examiner* — Harry K Liu
(74) *Attorney, Agent, or Firm* — CHIP LAW GROUP

(57) ABSTRACT

A measuring circuit is provided including a reception strength acquisition unit (114) that acquires reception strengths of received signals received from respective transmitting stations by an antenna (102) having a predetermined directivity; a direction component information acquisition unit (112) that acquires azimuth angle information and elevation angle information, obtained from each of the received signals with respect to a position of the antenna (102) used as a reference, of the each of the transmitting stations; a pattern generation unit (120) that maps a three-dimensional vector of the azimuth angle information, the elevation angle information, and the reception strength of each of the received signals to a virtual three-dimensional space with the antenna (102) being an origin to generate a first reception strength pattern; and a comparison unit (128) that compares the generated first reception strength pattern with a second reception strength pattern that is a known reception strength pattern to acquire an inclination of the antenna (102).

17 Claims, 12 Drawing Sheets

(58) Field of Classification Search
USPC .................................................. 342/357.36
See application file for complete search history.

(56) References Cited

FOREIGN PATENT DOCUMENTS

| | | | | |
|---|---|---|---|---|
| JP | 2005-227066 A | 8/2005 | | |
| JP | 2010-136282 A | 6/2010 | | |
| JP | 2011-215087 A | 10/2011 | | |
| JP | 2014-071099 A | 4/2014 | | |
| JP | 2015220735 A | * | 12/2015 | |
| WO | WO-2017130182 A1 | * | 8/2017 | ............. G01S 3/043 |

* cited by examiner

MEASURING CIRCUIT, MEASURING DEVICE, AND PROGRAM

CROSS REFERENCE TO RELATED APPLICATIONS

This application is a U.S. National Phase of International Patent Application No. PCT/JP2019/032145 filed on Aug. 16, 2019, which claims priority benefit of Japanese Patent Application No. JP 2018-156422 filed in the Japan Patent Office on Aug. 23, 2018. Each of the above-referenced applications is hereby incorporated herein by reference in its entirety.

TECHNICAL FIELD

The present disclosure relates to a measuring circuit, a measuring device, and a program.

BACKGROUND ART

In recent years, a technique for measuring the orientation of an antenna using a signal from a satellite or the like has been developed. Examples of such a technique can include the techniques disclosed in PTL 1 to PTL 3 below. Particularly, in PTL 1 to PTL 3 below, it is possible to measure the reception strength of a signal from a satellite whose azimuth is known by rotating an antenna having high directivity and to measure the orientation of the antenna based on the result of measuring the signal strength.

CITATION LIST

Patent Literature

[PTL 1]
JP 2005-227066 A
[PTL 2]
JP H11-231038 A
[PTL 3]
JP 2011-215087 A

SUMMARY

Technical Problem

However, all of the above-mentioned PTL 1 to PTL 3 disclose the technique for measuring only the orientation (direction) of the antenna while they are silent with respect to measuring the inclination of the antenna.

Therefore, the present disclosure proposes new improved measuring circuit, measuring device, and program capable of measuring the inclination of an antenna with high accuracy.

Solution to Problem

According to the present disclosure, a measuring circuit is provided including a reception strength acquisition unit that acquires reception strengths of received signals received from respective transmitting stations by an antenna having a predetermined directivity; a direction component information acquisition unit that acquires azimuth angle information and elevation angle information, obtained from each of the received signals with respect to a position of the antenna used as a reference, of the each of the transmitting stations; a pattern generation unit that maps a three-dimensional vector of the azimuth angle information, the elevation angle information, and the reception strength of each of the received signals to a virtual three-dimensional space with the antenna being an origin to generate a first reception strength pattern; and a comparison unit that compares the generated first reception strength pattern with a second reception strength pattern that is a known reception strength pattern to acquire an inclination of the antenna.

Further, according to the present disclosure, a measuring device is provided including an antenna having a predetermined directivity; a reception strength acquisition unit that acquires reception strengths of received signals received from respective transmitting stations by the antenna; a direction component information acquisition unit that acquires azimuth angle information and elevation angle information, obtained from each of the received signals with respect to a position of the antenna used as a reference, of the each of the transmitting stations; a pattern generation unit that maps a three-dimensional vector of the azimuth angle information, the elevation angle information, and the reception strength of each of the received signals to a virtual three-dimensional space with the antenna being an origin to generate a first reception strength pattern; and a comparison unit that compares the generated first reception strength pattern with a second reception strength pattern that is a known reception strength pattern to acquire an inclination of the antenna.

Further, according to the present disclosure, a program is provided for causing a computer to implement a function of acquiring reception strengths of received signals received from respective transmitting stations by an antenna having a predetermined directivity; a function of acquiring azimuth angle information and elevation angle information, obtained from each of the received signals with respect to a position of the antenna used as a reference, of the each of the transmitting stations; a function of mapping a three-dimensional vector of the azimuth angle information, the elevation angle information, and the reception strength of each of the received signals to a virtual three-dimensional space with the antenna being an origin to generate a first reception strength pattern; and a function of comparing the generated first reception strength pattern with a second reception strength pattern that is a known reception strength pattern to acquire an inclination of the antenna.

Advantageous Effects of Invention

As described above, according to the present disclosure, it is possible to provide a measuring circuit, a measuring device, and a program capable of measuring the inclination of an antenna with high accuracy.

Note that the above effects are not necessarily limited, and together with or in place of the above effects, any of the effects described herein, or any other effect that can be understood herein may be provided.

DESCRIPTION OF EMBODIMENTS

Figure 1:
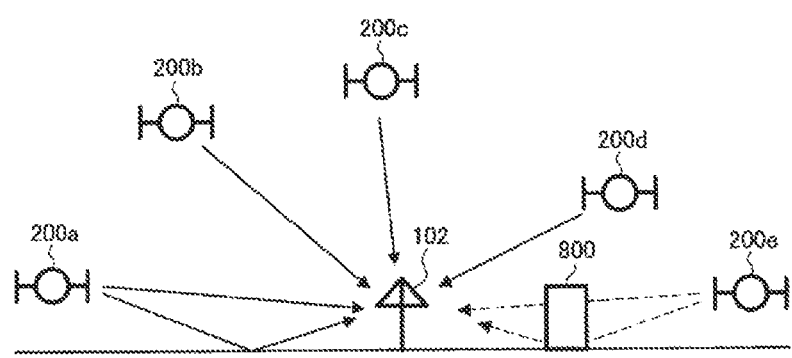
FIG. 1 is a schematic diagram (No. 1) for explaining a state where an antenna 102 mounted on a drone receives GNSS signals.

Preferred embodiments of the present disclosure will be described in detail below with reference to the accompanying drawings. Note that in the present specification and drawings, components having substantially the same functional configuration are designated by the same reference numerals to eliminate duplicate description.

Further, in the present specification and drawings, a plurality of components having substantially the same or similar functional configurations are sometimes distinguished by adding different alphabets after the same reference numerals. However, if it is not necessary to distinguish the plurality of components having substantially the same or similar functional configurations from each other, only the same reference numerals are given.

In addition, the drawings referred to in the following description are diagrams for facilitating the explanation and understanding of the embodiments of the present invention, and for the sake of clarity, the shapes, dimensions, ratios, and the like illustrated in the drawings may be different from their actual ones. Further, devices and the like illustrated in the drawings can be appropriately redesigned in consideration of the following description and known techniques. Further, the definition of a specific shape in the following description means that it is for not only a shape defined geometrically but also a shape similar to that shape, including a difference to the extent permitted in the implementation of the embodiments of the present disclosure described below. For example, the term "ellipsoid" as used in the following description refers to not only a solid obtained by rotating an ellipse with the major axis as a rotation axis but also a solid having a shape similar to that solid.

Note that the description will be given in the following order.

Figure 2:
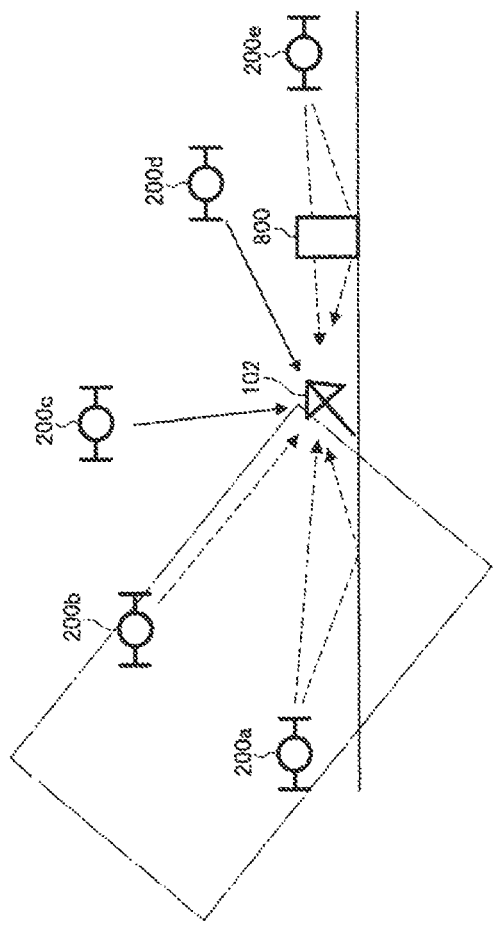
FIG. 2 is a schematic diagram (No. 2) for explaining a state where the antenna 102 mounted on the drone receives GNSS signals.
Figure 3:
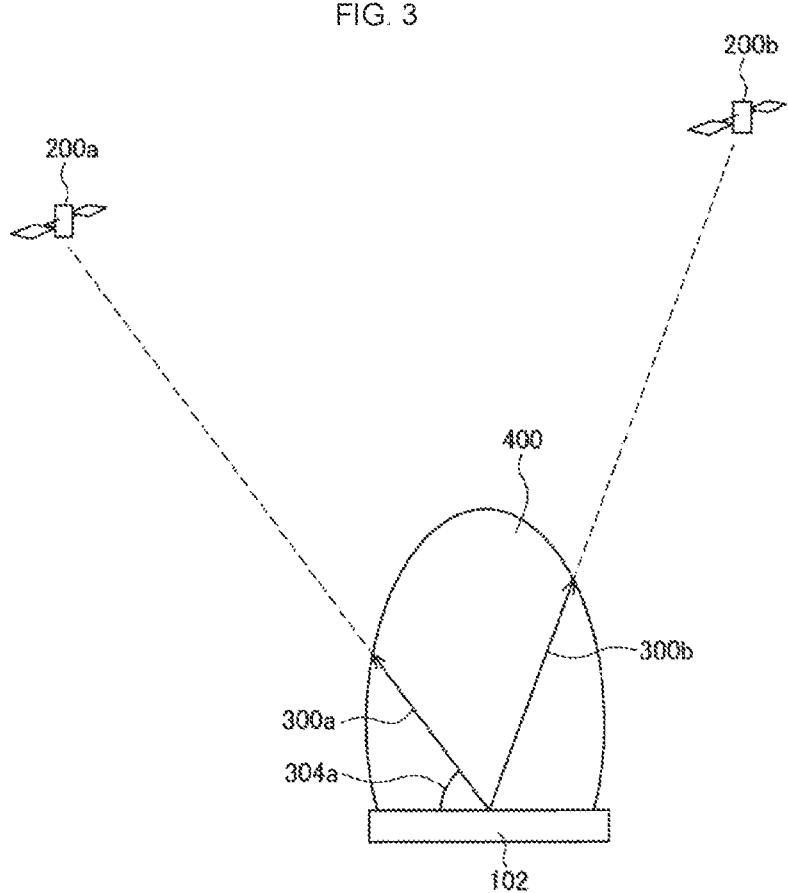
FIG. 3 is an explanatory diagram for explaining an example of a reception strength pattern 400 according to an embodiment of the present disclosure.

1. Background to Inventor Creating Embodiment according to Present Disclosure
2. Embodiment of Present Disclosure
  2.1. Outline Configuration of Measuring Device 10 according to Embodiment of Present Disclosure
  2.2. Detailed Configuration of Measurement Unit 100 according to Embodiment of Present Disclosure
  2.3. Measuring method according to Embodiment of Present Disclosure
    2.3.1 Registration Stage
    2.3.2 Measurement Stage
3. Summary
4. Application Example of Embodiment of Present Disclosure
5. Hardware Configuration
6. Supplement 1. Background to Inventor Creating Embodiment According to Present Disclosure First, prior to the specific description of the embodiments of the present disclosure, the background of the present inventor making the embodiments of the present disclosure will be described with reference to FIGS. 1 to 3. FIGS. 1 and 2 are each a schematic diagram for explaining a state where an antenna 102 mounted on a drone receives GNSS signals. Further, FIG. 3 is an explanatory diagram for explaining an example of a reception strength pattern 400 according to an embodiment of the present disclosure.

The present inventor has been intensively studying the antenna 102 (see FIGS. 1 and 2) that is mounted on a drone, which is an unmanned small airplane and can fly by an autonomous flight function, an independent attitude control function, and the like, and that is capable of receiving a GNSS (Global Navigation Satellite System) signal. Note that the antenna 102 includes, for example, a patch antenna, a chip antenna, or the like.

Particularly, a GNSS receiver mounted on the drone can receive, for example, GNSS signals from four or more GNSS satellites 200 (see FIGS. 1 and 2) via the antenna 102, and position the drone based on the received GNSS signals by means of triangulation. The antenna 102 is required to receive GNSS signals from more GNSS satellites 200 in order to perform accurate positioning.

Specifically, as illustrated in FIG. 1, the antenna 102 may receive the GNSS signal from a GNSS satellite 200e due to the presence of a shield 800 such as a building even when many GNSS satellites 200a to 200e are present above the antenna 102. Therefore, in consideration of such a case, it is preferable that the antenna 102 is installed in a state where more GNSS signals from the GNSS satellites 200a to 200e can be received.

A case will be examined below where, for example, a patch antenna, which is lightweight and directive, is used as the antenna 102 mounted on the drone. As illustrated in FIG. 1, when the antenna 102 is installed horizontally, the antenna 102 can receive GNSS signals from more GNSS satellites 200a to 200e according to the study of the inventor. Note that FIG. 1 illustrates the antenna 102 as an antenna installed vertically, but this illustration means that the antenna 102 is installed so that the plane of the patch antenna 102 is horizontal.

However, during the flight of the drone, the plane of the antenna 102 is not always kept horizontal. For example, as illustrated in FIG. 2, when the plane of the antenna 102 is installed so as to be inclined with respect to the horizontal direction, the antenna 102 receives the GNSS signals from the GNSS satellites 200c and 200d due to the directivity of the antenna 102 while it is difficult to receive the GNSS signals from the GNSS satellites 200a and 200b surrounded by a single point broken line. Note that FIG. 2 illustrates the antenna 102 as an antenna installed so as to have an inclination with respect to the vertical direction, but this illustration means that the antenna 102 is installed so that the plane of the patch antenna 102 has an inclination with respect to the horizontal direction.

Accordingly, in order to accurately position the drone, it is required to install the antenna 102 so that the plane of the antenna 102 is horizontal. Therefore, in order to install the antenna 102 so that the plane of the antenna 102 is horizontal, the inventor has been intensively studying a means for measuring the inclination of the plane of the antenna 102 first.

Note that in the following description, "measuring the inclination of the antenna 102" means measuring how much the plane of the antenna 102, which can receive a signal, is inclined with respect to the horizontal direction. Further, in the following description, the "elevation angle" means an angle formed by the plane of the antenna 102 and a line connecting the center point of the antenna 102 to the GNSS satellite 200. Furthermore, in the following description, the "azimuth angle" means a horizontal component of an angle formed by the line connecting the center point of the antenna 102 to the GNSS satellite 200 and a reference direction.

Incidentally, measurement of an inclination is generally measuring using a vertical displacement meter, a level (level gauge), an acceleration sensor, an inclination sensor, or the like. Where the direction of gravity (vertical direction) is defined as the perpendicular direction, these measuring instruments can measure their own inclination with respect to the perpendicular direction. However, for each of such measuring instruments using gravity, it is difficult to measure its own inclination accurately when the object to be measured (specifically, the antenna 102 or the drone, etc.) on which the measuring instrument is mounted is in motion, or when the correct direction of gravity cannot be measured due to an external force. Specifically, for example, there is a case where the object to be measured freely falls in the air, or a case where the object to be measured is blown by the wind during falling and then an unexpected moving acceleration is added to the falling speed (acceleration) of the object to be measured. Furthermore, it cannot be said that the measured direction of gravity (direction of gravitational acceleration) is always toward the center of the earth because such a measuring instrument is influenced by a distortion of the gravitational potential of the earth's crust and nearby huge heavy structures. In such a case, the direction of gravity deviates from the correct direction depending on the measurement location, and a large error occurs in the measurement result.

Further, measuring instruments for measuring the inclination can include a measuring instrument such as an interferometer for angle measurement used for measuring the angle of a specific object. However, since the interferometer for angle measurement is a measuring instrument for measuring the inclination using a difference between the measured distances of two points from a reference point, in principle, it is difficult to measure the inclination when the object to be measured is in motion.

Therefore, in view of such a situation, the inventor conceived of measuring the inclination of the antenna 102 by using the GNSS signals from the GNSS satellites 200.

The reason is that the inventor estimated that the use of GNSS signals makes it possible to measure the inclination of the antenna 102 with high accuracy because it is not measurement using gravity even when the drone on which the antenna 102 is mounted is in motion or even when the correct direction of gravity cannot be measured due to an external force. Also, the inventor expected that if the inclination of the antenna 102 could be measured by using GNSS signals, the advantage of measuring the inclination of the antenna 102 with high accuracy could be obtained.

Incidentally, as techniques for measuring the direction of an antenna by using a signal from a satellite, there are techniques disclosed in the above-mentioned PTL 1 to PTL 3. These disclosed techniques are each, specifically, a technique for measuring the reception strength of a signal from a satellite whose azimuth is known by rotating an antenna having high directivity and measuring the orientation of the antenna based on the result of measuring the reception strength. However, as described above, these PTL 1 to PTL 3 disclose the technique for measuring only the orientation of the antenna while they are silent with respect to measuring the inclination of the antenna.

Further, in PTL 1 and PTL 2, it is difficult to avoid complicated and large-sized device configuration because of the antenna having a movable structure, and it is also difficult to track multiple satellites because of the antenna in use having high directivity. Accordingly, it is difficult to apply the techniques disclosed in PTL 1 and PTL 2 to the measurement using GNSS signals.

Also, PTL 3 adopts the same measuring method as PTL 1 and PTL 2, but further uses a fitting function to improve the accuracy of measurement of the direction of the antenna. However, if the technique disclosed in PTL 3 is applied to the measurement using GNSS signals, it is considered that there is a high possibility that a large error will occur in the measurement result. Particularly, according to the study of the inventor, when a GNSS signal from a GNSS satellite in a direction having a small elevation angle as viewed from the antenna is used, the reception strength of the GNSS signal becomes low, and thus in such a case, there is a high possibility that a large error will occur in the method disclosed in PTL 3. Furthermore, in PTL 3, since the difference of transmission output for each satellite and the attenuation of signals due to free space propagation are not taken into consideration, according to the study of the inventor, it is estimated that high accuracy measurement is difficult.

Consequently, according to the study of the inventor, it is difficult for the above-mentioned PTL 1 to PTL 3 to measure the inclination of the antenna with high accuracy. Therefore, the inventor have made extensive studies and have created the embodiment of the present disclosure capable of measuring the inclination of an antenna with high accuracy.

Particularly, the embodiment of the present disclosure has been created based on the following ideas. First, the GNSS receiver as described above can acquire information on the position of each GNSS satellite 200 and the transmission time of the GNSS signal by demodulating the GNSS signal from each GNSS satellite 200. Accordingly, the GNSS receiver can position the GNSS receiver itself based on the acquired information by using triangulation.

Therefore, the inventor conceived of using the reception strength of each GNSS signal received by the antenna 102 and the position of each GNSS satellite 200 acquired by the GNSS receiver (azimuth angle and elevation angle 304 (FIG. 3) with respect to the position of the antenna 102 as a reference) to map a three-dimensional vector (reception strength vector) 300 of the respective reception strengths to a virtual three-dimensional space. Then, for example, mapping reception strength vectors 300a and 300b for a plurality of GNSS signals makes it possible to obtain a reception strength pattern 400 having a three-dimensional figure as illustrated in FIG. 3. Note that in FIG. 3, the two reception strength vectors 300a and 300b are illustrated, but in reality, it is regarded that, for example, eight or more reception strength vectors 300 are illustrated.

In an ideal reception environment, the reception strength pattern 400 has a three-dimensional figure that is almost similar to a radiation power pattern of the antenna 102 (indicating the characteristics of radiation power of the antenna 102 when a signal of a predetermined output is radiated from the antenna 102 in a laboratory) due to the characteristics of the antenna 102. Specifically, a patch antenna that the inventor have been studying has a radiation power pattern having an ellipsoidal hemisphere, and accordingly the reception strength pattern 400 is also a three-dimensional figure having an ellipsoidal hemisphere. Particularly, the reception strength pattern 400 is an ellipsoidal hemisphere obtained by cutting an ellipsoid, which is obtained by rotating an ellipse with its major axis as a rotation axis, with the plane of the patch antenna 102. Accordingly, when the plane of the patch antenna 102 is inclined, the reception strength pattern 400 becomes an inclined hemisphere according to the inclination of the plane.

Therefore, the inventor expected that comparing a reception strength pattern 400a (see FIG. 9) of the antenna 102 obtained at the time of measurement with a known reception strength pattern 400b (see FIG. 9) for the antenna 102 being kept horizontal makes it possible to measure how much the plane of the antenna 102 at the time of measurement is inclined with respect to the horizontal direction.

However, in an actual receiving environment, GNSS signals are attenuated due to propagation in free space. Furthermore, in an actual reception environment, the reception strength of a GNSS signal is proportional to the transmission output different depending on each GNSS satellite 200. Therefore, according to the study of the inventor, it has been found that simply mapping the plurality of reception strength vectors 300 to a virtual three-dimensional space does not make it possible to obtain the reception strength pattern 400 which is a three-dimensional figure similar to the radiation power pattern of the antenna 102, and instead makes it possible to obtain a three-dimensional irregular convex and concave figure. In such a case, it is difficult to measure the inclination of the antenna 102 by the comparison described above with high accuracy.

Accordingly, the inventor conceived of mapping the plurality of reception strength vectors 300 to a virtual three-dimensional space after performing processing (normalization) in consideration of signal attenuation due to propagation in free space and transmission output of each GNSS satellite 200. In other words, the inventor has created the embodiment of the present disclosure capable of measuring the inclination of the antenna 102 with high accuracy by taking into consideration the signal attenuation due to propagation in free space and the transmission output of the GNSS satellite 200. The details of the embodiment of the present disclosure created by the inventor will be sequentially described below.

Figure 4:
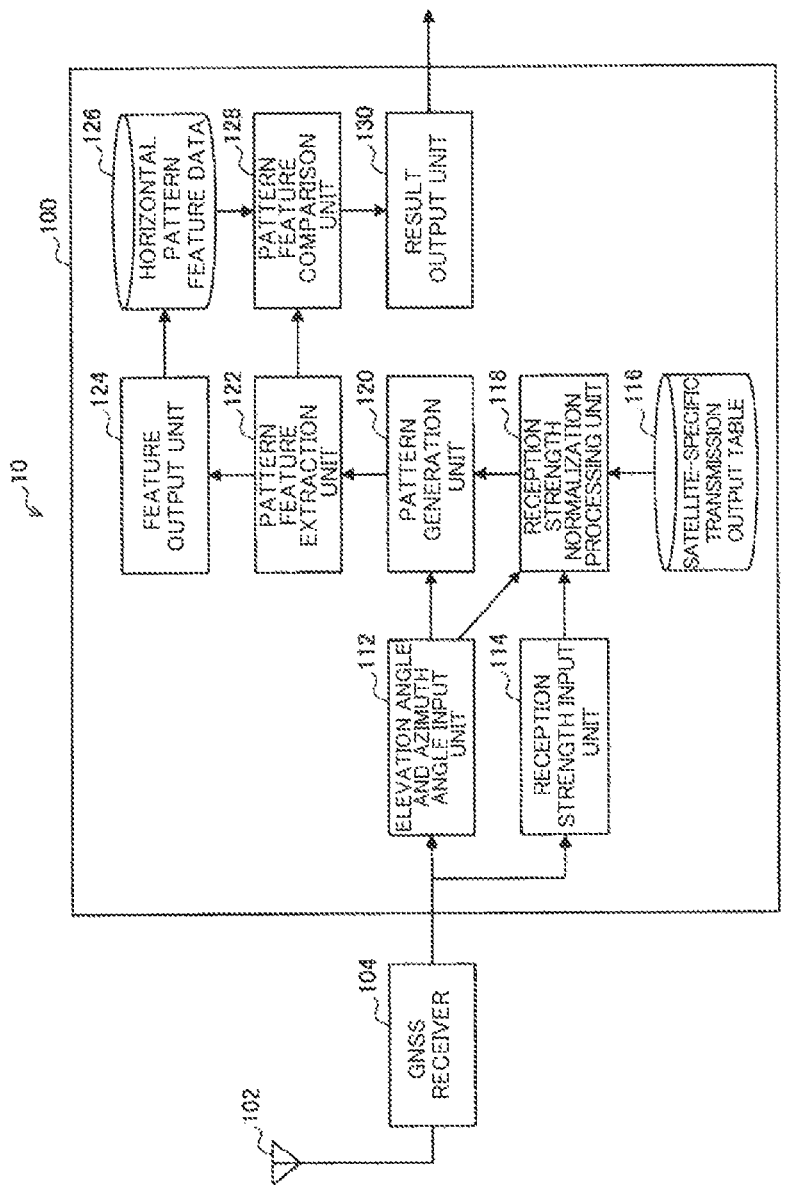
FIG. 4 is an explanatory diagram for explaining a configuration example of a measuring device 10 according to the embodiment of the present disclosure.

2. Embodiment of Present Disclosure 2.1. Outline Configuration of Measuring Device 10 According to Embodiment of Present Disclosure First, the outline configuration of a measuring device 10 according to the embodiment of the present disclosure will be described with reference to FIG. 4. FIG. 4 is an explanatory diagram for explaining a configuration example of the measuring device 10 according to the present embodiment.

As illustrated in FIG. 4, the measuring device 10 according to the present embodiment can mainly include a measurement unit (measuring circuit) 100, the antenna 102, and a GNSS receiver 104. The outline of each device included in the measuring device 10 according to the present embodiment will be described below.

(Measurement Unit 100)

The measurement unit 100 is a measurement unit that measures the inclination of the antenna 102, which will be described below, and is connected to the GNSS receiver 104, which will be described below. Note that a detailed configuration of the measurement unit 100 will be described below.

(Antenna 102)

The antenna 102 is connected to the front stage of the measurement unit 100 described above via the GNSS receiver 104, which will be described below. The antenna 102 is an antenna having a predetermined directivity that can radiate a signal in a specific direction, and includes, for example, a patch antenna or a chip antenna. Particularly, the antenna 102 is an antenna for GNSS that can receive a GNSS signal (received signal) and perform positioning together with the GNSS receiver 104. More specifically, the antenna 102 is, for example, an antenna that can receive a GNSS signal from the GNSS satellite (transmitting station) 200 of 1.575 GHz, and has a radiation power pattern having an ellipsoidal hemisphere. Note that an antenna for GNSS for receiving GNSS signals is typically designed so as to have an increased sensitivity in the upward direction with respect to the plane of the antenna, and a high uniform directivity of the antenna above the plane. Therefore, the radiation power pattern of the antenna 102 is an ellipsoidal hemisphere having a smooth curved surface with few lobes and null points.

(GNSS Receiver 104)

The GNSS receiver 104 can detect a GNSS signal from the GNSS satellite 200 via the antenna 102 described above, and perform positioning based on the detected GNSS signal. Particularly, the GNSS receiver 104 can detect and track GNSS signals from a plurality of GNSS satellites 200. Further, the GNSS receiver 104 can calculate the position of each GNSS satellite 200 and the distance to each GNSS satellite from a navigation message obtained by synchronizing the time and decoding the GNSS signal, and position the GNSS receiver 104 itself by using triangulation. Note that in order for the GNSS receiver 104 to perform positioning, it is preferable to detect GNSS signals from at least four GNSS satellites 200.

Further, in the present embodiment, the GNSS receiver 104 can calculate the azimuth angle and the elevation angle 304 (see FIG. 3) of each GNSS satellite 200 with respect to the antenna 102 based on the positioning result, and output the calculated angles to the measurement unit 100. In addition, in the present embodiment, the GNSS receiver 104 can measure the reception strength of each GNSS signal and output the measurement result to the measurement unit 100. Note that in the present embodiment, the GNSS receiver 104 may output information on a distance between the antenna 102 and each GNSS satellite 200 to the measurement unit 100, and may further output various information obtained from the navigation message to the measurement unit 100.

Note that in the present embodiment, the outline configuration of the measuring device 10 is not limited to the configuration illustrated in FIG. 4.

Figure 5:
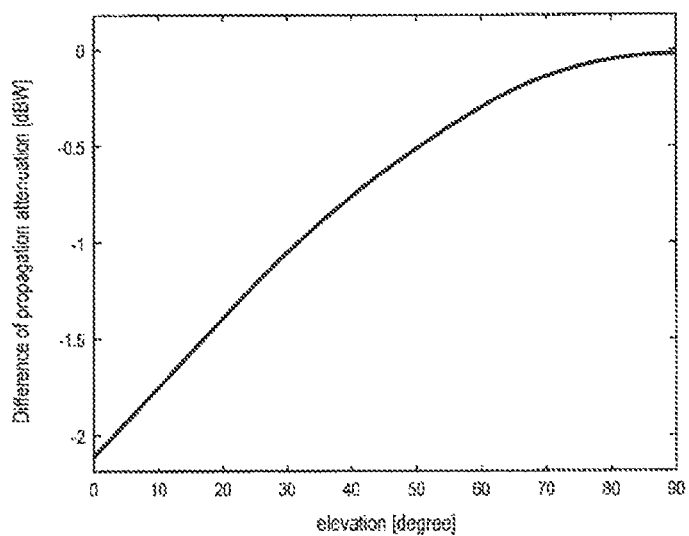
FIG. 5 is a graph of an example of a relationship between an elevation angle 304 and an amount of attenuation.

2.2. Detailed Configuration of Measurement Unit 100 According to Embodiment of Present Disclosure Next, the measurement unit 100 according to the embodiment of the present disclosure will be described with reference to FIGS. 4 and 5. FIG. 5 is a graph of an example of a relationship between an elevation angle 304 and an amount of attenuation.

In the present embodiment, the measurement unit 100 may be configured as, for example, a circuit mounted on one or more chips, or may be configured as a device composed of a plurality of parts and the like. Alternatively, in the present embodiment, the measurement unit 100 may be configured as a plurality of separate devices connected to each other by communication means, and is not particularly limited.

As illustrated in FIG. 4, the measurement unit 100 mainly includes an elevation angle and azimuth angle input unit (direction component information acquisition unit) 112, a reception strength input unit (reception strength acquisition unit) 114, a reception strength normalization processing unit (normalization unit) 118, a pattern generation unit 120, a pattern feature extraction unit (extraction unit) 122, a feature output unit 124, a pattern feature comparison unit (comparison unit) 128, and a result output unit 130. The details of each functional unit of the measurement unit 100 will be described below.

(Elevation Angle and Azimuth Angle Input Unit 112)

The elevation angle and azimuth angle input unit 112 can acquire from the GNSS receiver 104 information on the azimuth angle and the elevation angle 304 (see FIG. 3), obtained based on each received GNSS signal with respect to the position of the antenna 102 used as a reference, of each GNSS satellite (transmitting station). Then, the elevation angle and azimuth angle input unit 112 can output the acquired information on the azimuth angle and the elevation angle 304 to the pattern generation unit 120 and the reception strength normalization processing unit 118, which will be described below.

(Reception Strength Input Unit 114)

The reception strength input unit 114 can acquire from the above-described GNSS receiver 104 the reception strength of the GNSS signal received by the antenna 102 from each GNSS satellite. Then, the reception strength input unit 114 can output the acquired information to the reception strength normalization processing unit 118, which will be described below. Note that in the present embodiment, the reception strength input unit 114 may acquire from the GNSS receiver 104 information on a distance between the antenna 102 and each GNSS satellite 200, and may further acquire various types of information obtained from the navigation message.

Note that in the present embodiment, the elevation angle and azimuth angle input unit 112 and the reception strength input unit 114 may be configured together as one functional unit, and are not particularly limited.

(Reception Strength Normalization Processing Unit 118)

The reception strength normalization processing unit 118 can normalize the reception strength of each GNSS signal input from the reception strength input unit 114 described above.

In the present embodiment, in order to take into consideration the attenuation of signals due to propagation in free space, the reception strength normalization processing unit 118 can obtain each normalized reception strength (C/N (dB)) by subtracting an amount of attenuation (dBW) due to the above attenuation from the reception strength (received power gain (dBW)) of each GNSS signal input from the reception strength input unit 114 or by adding them. Further, in the present embodiment, in order to take into consideration the transmission output of each GNSS satellite 200, the reception strength normalization processing unit 118 can obtain each normalized reception strength by adding a difference (dBW) between the transmission outputs to the reception strength of each GNSS signal. In the present embodiment, the reception strength pattern 400, which is a three-dimensional figure similar to the radiation power pattern of the antenna 102, can be obtained by performing the normalization as described above. Since the reception strength pattern 400 thus obtained has a smooth curved surface with few lobes and null points, it can be accurately fitted to a predetermined model pattern.

Particularly, first, in the present embodiment, the reception strength normalization processing unit 118 can normalize the reception strength of each GNSS signal by using the distance between the antenna 102 and each GNSS satellite 200. As described above, since GNSS signals are attenuated due to propagation in free space, basically, the longer the distance between the antenna 102 and the GNSS satellite 200, the more the GNSS signal is attenuated. Therefore, in the present embodiment, the reception strength normalization processing unit 118 normalizes the reception strength of each GNSS signal by using the distance between the antenna 102 and each GNSS satellite 200, thereby correcting the difference of the attenuation between the GNSS signals caused due to propagation in free space.

Specifically, in the present embodiment, the reception strength normalization processing unit 118 can normalize the reception strength of each GNSS signal by using the elevation angle 304 (see FIG. 3) of each GNSS satellite. In other words, in the present embodiment, using the elevation angle 304 instead of the distance between the antenna 102 and the GNSS satellite 200 makes it possible to correct the difference of the attenuation between the GNSS signals caused due to propagation in free space.

Particularly, the reception strength of the GNSS signal from the GNSS satellite 200 increases as the elevation angle 304 increases, and the reception strength decreases as the elevation angle 304 decreases. The reason will be described below. The GNSS satellite 200 is flying in a predetermined orbit (at a constant distance from the earth) around the earth. Accordingly, for example, when the GNSS satellite 200 is located directly above the antenna 102, that is, when the elevation angle 304 is large, the distance between the antenna 102 and the GNSS satellite 200 is short. In such a case, since the propagation distance of the GNSS signal from the GNSS satellite 200 is also short, the attenuation of the GNSS signal is reduced, and thus the reception strength of the GNSS signal is increased. On the other hand, for example, when the GNSS satellite 200 is located close to the ground (in other words, at a low height), that is, when the elevation angle 304 is small, the distance between the antenna 102 and the GNSS satellite 200 is long. In such a case, since the propagation distance of the GNSS signal from the GNSS satellite 200 is also long, the attenuation of the GNSS signal is increased, and thus the reception strength of the GNSS signal is reduced. Therefore, instead of the distance between the antenna 102 and the GNSS satellite 200, the elevation angle 304, which is inversely proportional to that distance, can be used.

Then, the relationship between the elevation angle 304 and the amount of attenuation of the GNSS signal as described above is, for example, the relationship illustrated in FIG. 5. In FIG. 5, the X-axis (horizontal direction in FIG.

5) indicates the elevation angle 304, and the Y-axis (vertical direction in FIG. 5) indicates the amount of attenuation (dBW). Note that in FIG. 5, the amount of attenuation is indicated by a negative sign. Then, for example, if the relationship between the elevation angle 304 and the amount of attenuation of the GNSS signal as illustrated in FIG. 5 is known, an amount of attenuation can be obtained based on an elevation angle 304, so that the difference of the attenuation between the GNSS signals caused due to propagation in free space can be corrected. Note that as illustrated in FIG. 5, when the elevation angle 304 is small, the amount of attenuation is, for example, about 2 dBW, and it can be seen that such a value is not negligible when trying to measure the inclination of the antenna 102 with high accuracy.

Therefore, in the present embodiment, the reception strength normalization processing unit 118 acquires an amount of attenuation corresponding to an elevation angle 304 of the GNSS satellite 200 based on the relationship between the known elevation angle 304 angle and the amount of attenuation of signal acquired in advance by measurement or simulation in a laboratory. Then, the reception strength normalization processing unit 118 can perform normalization in which the difference of the attenuation between the GNSS signals caused due to propagation in free space is corrected by subtracting the obtained amount of attenuation from the reception strength of the GNSS signal input from the reception strength input unit 114 (or by adding them in a case where the amount of attenuation is indicated by an absolute value).

Note that in the present embodiment, the reception strength normalization processing unit 118 is not limited to being for normalizing the reception strength of each GNSS signal by using the elevation angle 304, and may perform normalization directly by, for example, using the distance between the antenna 102 and each GNSS satellite 200 acquired from the GNSS receiver 104.

Furthermore, in the present embodiment, the reception strength normalization processing unit 118 can also normalize the reception strength of each GNSS signal by using the transmission output of the GNSS satellite 200.

Particularly, if the transmission output of the GNSS satellite 200 is high, the reception strength of the GNSS signal received by the antenna 102 is also high, and if the transmission output of the GNSS satellite 200 is low, the reception strength of the GNSS signal received by the antenna 102 is also low. However, the transmission outputs of the respective GNSS satellites 200 are not the same, and vary greatly depending on each generation. For example, there is a difference of up to about 6 dBW between the transmission output of an old type of GNSS satellite 200 and the transmission output of a new type of GNSS satellite 200, which is not a negligible value when trying to measure the inclination of the antenna 102 with high accuracy. Therefore, in the present embodiment, the reception strength normalization processing unit 118 acquires a difference between the largest transmission output of the transmission outputs of new type of GNSS satellites 200 and the transmission output of each GNSS satellite 200. Then, the reception strength normalization processing unit 118 can perform normalization in which the difference of the transmission output between the GNSS satellites 200 is corrected by adding the acquired difference to the reception strength of each GNSS signal input from the reception strength input unit 114.

More specifically, the reception strength normalization processing unit 118 can acquire from the reception strength input unit 114 identification information (e.g., satellite number, satellite type, satellite-specific pseudo noise code (PRN), etc.) for identifying each GNSS satellite 200, obtained from the above-mentioned navigation message. Furthermore, the reception strength normalization processing unit 118 can refer to information stored in a satellite-specific transmission output table 116 to acquire a transmission output value (transmission output information) of the corresponding GNSS satellite 200 based on the acquired identification information. Note that the satellite-specific transmission output table 116 in a storage unit (not illustrated) provided in the measurement unit 100 stores the transmission output value associated with the identification information.

(Pattern Generation Unit 120)

The pattern generation unit 120 can map a three-dimensional vector (reception strength vector) 300 of the azimuth information, the elevation angle information, and the reception strength normalized by the reception strength normalization processing unit 118, of each GNSS signal to a virtual three-dimensional space with the antenna 102 being an origin to generate the reception strength pattern 400. Particularly, the pattern generation unit 120 can obtain the reception strength vector 300 by determining a direction component of the reception strength vector based on the azimuth information and the elevation angle information and further determining a scalar component of the reception strength vector based on the normalized reception strength. Then, the pattern generation unit 120 maps a plurality of reception strength vectors 300 obtained in this way, so that a reception strength pattern 400 can be generated which is a three-dimensional figure composed of a collection of points indicated by each reception strength vector 300. Furthermore, the pattern generation unit 120 can output the generated reception strength pattern 400 to the pattern feature extraction unit 122, which will be described below.

(Pattern Feature Extraction Unit 122)

The pattern feature extraction unit 122 can extract a feature of the reception strength pattern 400 generated by the pattern generation unit 120 described above. For example, the pattern feature extraction unit 122 can extract an axis of the reception strength pattern 400 as a feature by fitting the generated reception strength pattern 400 to a predetermined model pattern. Particularly, the pattern feature extraction unit 122 can extract the axis of the reception strength pattern 400 by fitting the generated reception strength pattern 400 to a model pattern of an ellipsoidal hemisphere by using the least squares method. The axis of the reception strength pattern 400 to be extracted in the present embodiment can be, for example, at least one of a Z axis extending from the center point of the hemisphere of the ellipsoid in the major axis direction of the ellipsoid, and X and Y axes extending in the minor axis direction of the ellipsoid and intersecting perpendicularly to each other at the center point (see FIG. 9). Note that the axis of the reception strength pattern 400 to be extracted in the present embodiment is not limited to the above-mentioned X-axis, Y-axis, and Z-axis, and may be an axis of another form. Furthermore, the pattern feature extraction unit 122 may determine a measurement error based on a fitting difference at the time of the fitting. Then, the pattern feature extraction unit 122 can output the extracted feature to the feature output unit 124 and the pattern feature comparison unit 128, which will be described later.

(Feature Output Unit 124)

The feature output unit 124 stores as horizontal pattern feature data 126 the feature(s) (e.g., axis) of a reception strength pattern (known reception strength pattern) (second reception strength pattern) 400b (see FIG. 9), obtained at a registration stage of a measuring method according to the present embodiment, which will be described below, in a state where the antenna 102 is installed at a predetermined inclination (known inclination). For example, the known reception strength pattern 400b is a reception strength pattern in a state where the antenna 102 is installed so that the plane of the antenna 102 is horizontal. Note that the horizontal pattern feature data 126 can be stored in a storage unit (not illustrated) provided in the measurement unit 100. In addition, the horizontal pattern feature data 126 may also store the reception strength pattern 400b corresponding to the stored feature. Furthermore, the horizontal pattern feature data 126 can be read by the pattern feature comparison unit 128, which will be described below.

(Pattern Feature Comparison Unit 128)

The pattern feature comparison unit 128 can compare the feature(s) of the newly generated reception strength pattern 400a (see FIG. 9) (first reception strength pattern) with the feature(s) of the known reception strength pattern 400b (see FIG. 9) to acquire the inclination of the antenna 102 based on a difference between their features. Particularly, for example, the pattern feature comparison unit 128 can acquire the inclination of the antenna 102 by acquiring the axis of the known reception strength pattern 400b corresponding to one axis of the newly extracted reception strength pattern 400a, and calculating an angle of the axis of the reception strength pattern 400a with respect to the corresponding axis of the known reception strength pattern 400b. Further, the pattern feature comparison unit 128 may acquire the inclination of the antenna 102 by performing pattern matching between the reception strength pattern 400a and the known reception strength pattern 400b. In this case, the pattern feature comparison unit 128 can rotate one of the reception strength pattern 400a and the known reception strength pattern 400b to match the other, and acquire the inclination of the antenna 102 based on the rotation angle of an axis of one of the matched patterns. Then, the pattern feature comparison unit 128 can output the acquired inclination of the antenna 102 to the result output unit 130, which will be described below.

(Result Output Unit 130)

The result output unit 130 can output the result of the inclination of the antenna 102 obtained by the pattern feature comparison unit 128 described above to another device.

Note that in the present embodiment, the detailed configuration of the measurement unit 100 is not limited to the configuration illustrated in FIG. 4.

2.3. Measuring Method According to Embodiment of Present Disclosure

The details of each device included in the measuring device 10 according to the present embodiment is described above. Subsequently, the measuring method according to the present embodiment will be described. The measuring method according to the present embodiment generally includes two stages: a registration stage to store a reception strength pattern (known reception strength pattern) 400b in advance in a state where the antenna 102 is installed at a predetermined inclination (specifically, the antenna 102 is installed so that the plane of the antenna 102 is horizontal); and a measurement stage to refer to the stored reception strength pattern 400b to perform measurement.

Note that in the present embodiment, the number of GNSS satellites 200 that transmit GNSS signals to be received by the measuring device 10 is preferably eight or more in order to generate the reception strength pattern 400 with high accuracy. Further, in the present embodiment, signals to be received by the measuring device 10 are not limited to the GNSS signals from the GNSS satellites 200. In the present embodiment, a signal to be received by the measuring device 10 may be, for example, a signal from another satellite, a signal from a base station installed on the ground, or a signal from an access point that allows a connection via wireless communication from another device.

(2.3.1 Registration Stage)

Figure 6:
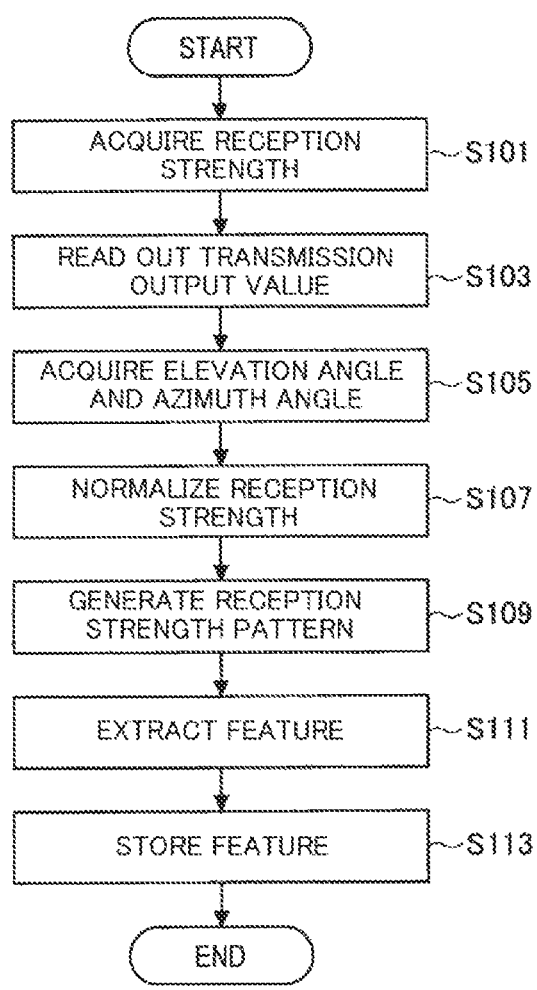
FIG. 6 is a flowchart for explaining a registration stage of a measuring method according to the embodiment of the present disclosure.

First, the registration stage of the measuring method according to the present embodiment will be described with reference to FIG. 6. FIG. 6 is a flowchart for explaining the registration stage of the measuring method according to the present embodiment.

As illustrated in FIG. 6, the registration stage according to the present embodiment includes a plurality of steps from step S101 to step S113. The details of each step included at the registration stage according to the present embodiment will be described below.

First, at the registration stage, the antenna 102 is kept so that the plane of the antenna 102 is horizontal, the reception strength pattern 400b (see FIG. 9) at this time is acquired, and the axes of the acquired reception strength pattern 400b are stored as the horizontal pattern feature data 126. Then, the axes of the acquired reception strength pattern 400b are read out and used at the measurement stage to be performed after that. In other words, the registration stage can be regarded as a stage corresponding to calibration of a sensor such as a gyro sensor. Note that in the present embodiment, an axis (or axes) of the reception strength pattern 400b to be stored at the registration stage is not limited to an axis (or axes) of the reception strength pattern 400b obtained in the state where the antenna 102 is installed so that the plane of the antenna 102 is horizontal. In the present embodiment, for example, the axis may be an axis of the reception strength pattern 400 obtained in a state where the antenna 102 is installed so that the plane of the antenna 102 has a known inclination.

Note that since the reception strength pattern 400b in the state where the antenna 102 is kept horizontal is determined by the characteristics of the antenna 102 and the device design, it can be shared among measuring devices 10 having the same design. Accordingly, the registration stage is performed in one measuring device 10, and the other measuring devices 10 are operated to store the axis (feature) of the reception strength pattern 400b obtained at the registration stage in a storage unit (not illustrated).

Then, the GNSS receiver 104 detects GNSS signals from the respective GNSS satellites 200 and positions the GNSS receiver 104. At this time, it is preferable to take as much time as a highly accurate reception strength pattern 400b is obtained in positioning.

Particularly, the GNSS receiver 104 acquires information on the azimuth angle and the elevation angle 304 (see FIG. 3) of each GNSS satellite 200 with respect to the antenna 102, and the reception strength of each GNSS signal, based on the result of the positioning. Furthermore, the GNSS receiver 104 acquires identification information for identifying each GNSS satellite from a navigation message obtained from each GNSS signal.

—Step S101—

First, the measurement unit 100 acquires the reception strength of each GNSS signal from the GNSS receiver 104. At this time, the measurement unit 100 acquires identification information for identifying each GNSS satellite 200 from the GNSS receiver 104.

—Step S103—

Next, the measurement unit 100 reads out, based on the identification information acquired in step S101 described above, a transmission output value of the corresponding GNSS satellite 200 from the satellite-specific transmission output table 116.

—Step S105—

Then, the measurement unit 100 acquires information on the elevation angle 304 and the azimuth angle of each GNSS satellite 200 from the GNSS receiver 104.

—Step S107—

Next, the measurement unit 100 normalizes the reception strength acquired in step S101 described above based on the transmission output value of the GNSS satellite 200 read out in step S103 described above and the information on the elevation angle of the GNSS satellite 200 acquired in step S105 described above.

—Step S109—

Then, the measurement unit 100 generates a reception strength pattern 400b (see FIG. 9) (known reception strength pattern) based on the reception strength normalized in step S107 described above and the information on the elevation angle and azimuth angle of the corresponding GNSS satellite 200 acquired in step S105 described above.

At this time, if the number of reception strength vectors 300 used to generate the reception strength pattern 400b is, for example, four or less, the measurement unit 100 cannot accurately generate the reception strength pattern 400b, and thus may determine that it is a measurement error to perform the registration stage again. Further, if the magnitude of at least one of the plurality of reception strengths to be used to generate the reception strength pattern 400b is smaller than a predetermined threshold value, the measurement unit 100 may exclude the corresponding reception strength, or may determine that it is a measurement error to perform the registration stage again. Alternatively, if it is determined that the quality (e.g., noise component) of at least one of the plurality of GNSS signals to be used to generate the reception strength pattern 400b does not reach a predetermined quality level, the measurement unit 100 may exclude the corresponding GNSS signal, or may determine that it is a measurement error to perform the registration stage again.

—Step S111—

Next, the measurement unit 100 fits the reception strength pattern 400b generated in step S109 described above to a model pattern of an ellipsoidal hemisphere by using the least squares method. Then, the measurement unit 100 can use the result of the fitting to extract an axis of the reception strength pattern 400b and/or a size of the reception strength pattern 400b (e.g., the lengths of the X-axis, the Y-axis, the Z-axis, etc.) as features.

Specifically, as described above, the antenna 102 for receiving GNSS signals is typically designed so as to have an increased sensitivity in the upward direction with respect to the plane of the antenna 102, and a high uniform directivity above that plane. Therefore, the radiation power pattern of the antenna 102 is an ellipsoidal hemisphere having a smooth curved surface with few lobes and null points. Accordingly, in the present embodiment, the reception strength pattern 400b, which is similar to the radiation power pattern, is also an ellipsoidal hemisphere having a smooth curved surface with few lobes and null points, so that the model pattern to be fitted is also preferably an ellipsoidal hemisphere. Such a model pattern can be represented by a quadratic polynomial in a three-dimensional space of rectangular coordinate system, and the parameters indicating the reception strength pattern 400b can be acquired by fitting the points of the reception strength pattern 400b to the corresponding points of a spherical surface represented by the quadratic polynomial by using the least squares method. Then, the measurement unit 100 can extract a feature of the reception strength pattern 400b, for example, an axis, from the calculated parameters.

At this time, if the fitting difference is larger than a predetermined threshold value due to noise or the like, the measurement unit 100 may determine that it is a measurement error to perform the registration stage again.

—Step S113—

The measurement unit 100 stores the axis (feature) of the reception strength pattern 400b extracted in step S111 described above in a storage unit (not illustrated). At this time, the measurement unit 100 may store the reception strength pattern 400b (particularly, the parameter(s) indicating the reception strength pattern 400b) generated in step S109 described above.

Note that in the above description, an axis of the reception strength pattern 400b in a state where the antenna 102 is installed at a predetermined inclination (horizontal) at the registration stage is described as being stored in advance as a feature of the known reception strength pattern, and however, the present embodiment is not limited to that. For example, in the present embodiment, the measurement unit 100 may store in advance an axis (feature) of the radiation power pattern acquired by the design (simulation) of the antenna 102 or a preliminary measurement as a feature of the known reception strength pattern 400b. As described above, since the radiation power pattern of the antenna 102 is similar to the reception strength pattern 400b of the antenna 102 in the ideal state, the axis (axes) of the radiation power pattern can be treated as the feature(s) of the known reception strength pattern 400b. Accordingly, in such a case, the operation at the registration stage as described above can be omitted.

(2.3.2 Measurement Stage)

Figure 7:
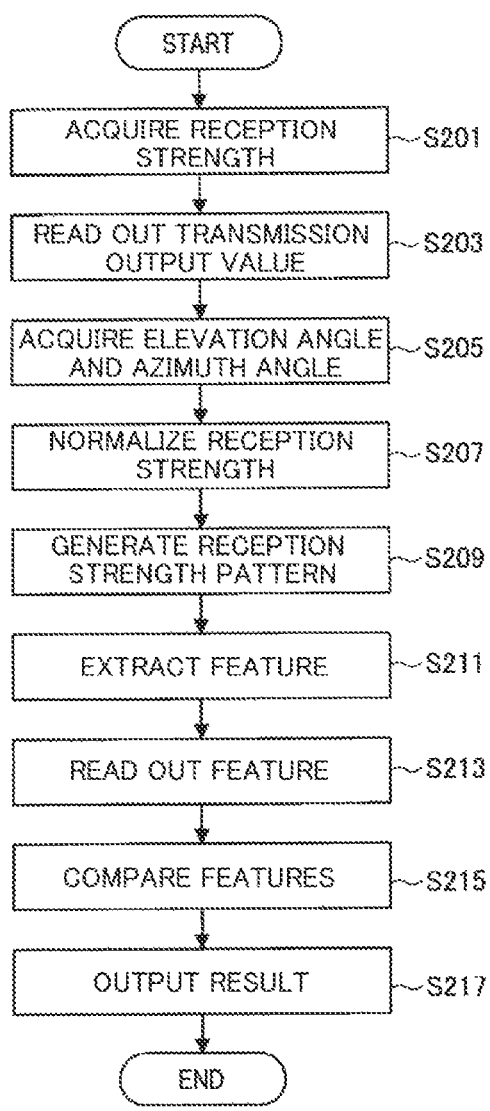
FIG. 7 is a flowchart for explaining a measurement stage of the measuring method according to the embodiment of the present disclosure.
Figure 8:
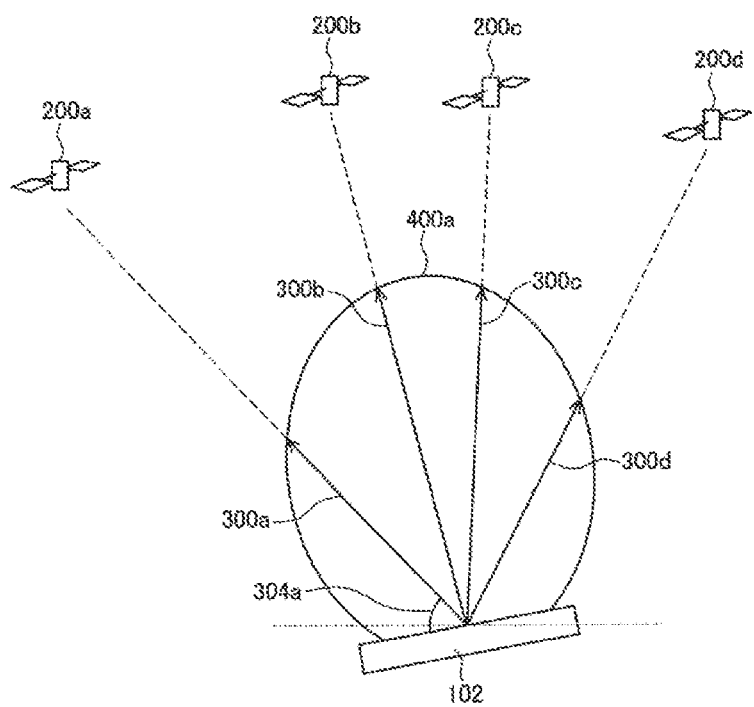
FIG. 8 is an explanatory diagram for explaining an example of a reception strength pattern 400a obtained in the measurement stage of the measuring method according to the embodiment of the present disclosure.
Figure 9:
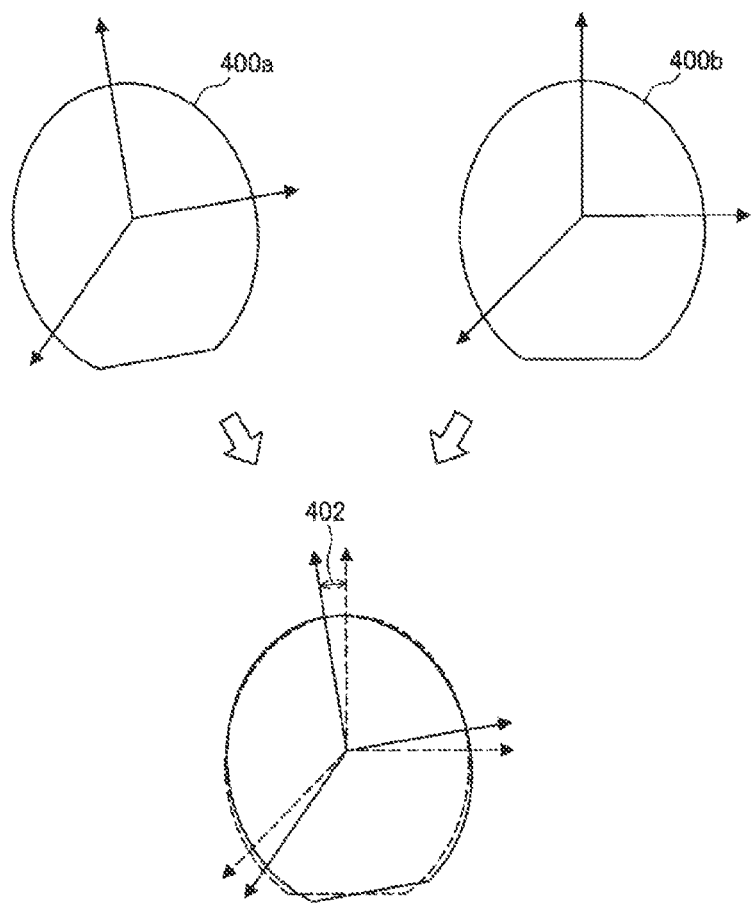
FIG. 9 is an explanatory diagram for explaining an example of comparison in the measurement stage of the measuring method according to the embodiment of the present disclosure.

Next, the measurement stage of the measuring method according to the present embodiment will be described with reference to FIGS. 7 to 9. FIG. 7 is a flowchart for explaining the measurement stage of the measuring method according to the present embodiment. FIG. 8 is an explanatory diagram for explaining an example of the reception strength pattern 400a obtained at the measurement stage of the measuring method according to the present embodiment. Further, FIG. 9 is an explanatory diagram for explaining an example of comparison at the measurement stage of the measuring method according to the present embodiment.

As illustrated in FIG. 7, the measurement stage according to the present embodiment includes a plurality of steps from step S201 to step S217. Note that since steps S201 to S211 in FIG. 7 are the same as steps S101 to S111 in FIG. 6 described above, the detailed description of these steps is omitted and steps S213 to S217 will be described herein.

—Steps S201 to S209—

First, at the measurement stage, a reception strength pattern 400a as illustrated in FIG. 8 can be acquired by performing steps S201 to S209 of FIG. 7 in the same manner as in steps S101 to S109 of FIG. 6. At this time, as illustrated in FIG. 8, since the antenna 102 is installed so that the plane of the antenna 102 is slightly inclined with respect to the horizontal direction, the reception strength pattern 400a is an ellipsoidal hemisphere that is also slightly inclined according to the inclination of the antenna 102.

—Step S211—

Next, the measurement unit 100 fits the reception strength pattern 400*a* generated in step S209 to a model pattern of an ellipsoidal hemisphere by using the least squares method as in step S111 of FIG. 6. Then, the measurement unit 100 extracts an axis of the reception strength pattern 400*a* as a feature by using the result of the fitting.

—Step S213—

Then, the measurement unit 100 reads out the axis (feature) of the reception strength pattern 400*b* stored at the registration stage described above.

—Step S215—

The measurement unit 100 compares the axis of the reception strength pattern 400*b* read out in step S213 described above with the axis of the reception strength pattern 400*a* extracted in step S211 described above. Specifically, as illustrated in FIG. 9, the measurement unit 100 can acquire the inclination of the antenna 102 by calculating an angle 402, which is the difference between one of the extracted axes of the reception strength pattern 400*a* and the corresponding axis of the reception strength pattern 400*b*.

—Step S217—

The measurement unit 100 outputs the angle 402 acquired in step S215 described above to another device as the result of measuring the inclination of the antenna 102.

At this time, if the obtained result of measuring the inclination of the antenna 102 is a value determined to be abnormal as compared with the result of measuring the inclination of the antenna 102 obtained immediately before or a predetermined threshold value, the measurement unit 100 may determine that it is a measurement error to perform the measurement stage again.

Note that a loss caused by various factors in the respective GNSS signals received by the antenna 102 is not constant in time and space, and appears non-uniformly over the GNSS signals. Accordingly, in the present embodiment, in order to obtain a highly accurate reception strength pattern 400, in other words, a reception strength pattern 400 that can be smoothly fitted to the model pattern, it is preferable that a large number of reception strength vectors 300 are used to generate the reception strength pattern 400. Therefore, in the present embodiment, the number of reception strength vectors 300 may be increased as follows.

In the present embodiment, for example, the antenna 102 having a large reception gain is used so as to receive the GNSS signal from the GNSS satellite 200 having a small elevation angle and the GNSS satellite 200 having a small transmission output. With such a configuration, the number of GNSS signals that can be received increases, so that the number of reception strength vectors 300 can be increased.

Further, in the present embodiment, not only signals from a single type of satellite but also signals from different types of satellites may be received, and with such a configuration, the number of signals that can be received increases, so that the number of reception strength vectors 300 can be increased. For example, in the present embodiment, the measuring device 10 may be configured to receive not only signals from a GPS (Global Positioning System) satellite but also signals from a GLONASS (Global Navigation Satellite System) satellite, a Beidou (BeiDou Navigation Satellite System) satellite, and/or a Galileo satellite, which are each one type of the GNSS satellite 200. Also with such a configuration, the number of signals that can be received increases, so that the number of reception strength vectors 300 can be increased.

Further, in the present embodiment, when the antenna 102 is stationary or the rotation speed of the antenna 102 is slow, GNSS signals from the GNSS satellite 200 may be received (captured) for a long time. Also with such a configuration, the number of GNSS signals that can be received increases depending on the long period of time for reception, so that the number of reception strength vectors 300 can be increased.

3. Summary

As described above, according to the embodiment of the present disclosure, the inclination of the antenna 102 can be measured with high accuracy. Particularly, according to the embodiment of the present disclosure, it is possible to measure the inclination of the antenna 102 with high accuracy because it is not measurement using gravity, for example, even when a drone 700 or the like on which the antenna 102 is mounted is in motion or when the correct direction of gravity cannot be measured due to an external force. Further, according to the present embodiment, even when there is an influence of a distortion of the gravitational potential of the earth's crust or nearby huge heavy structures, it is possible to suppress an error and thus to measure the inclination of the antenna 102 with high accuracy.

In addition, according to the present embodiment, since the measurement is performed in consideration of the attenuation of GNSS signals due to propagation in free space and the transmission output of the GNSS satellite 200, it is possible to measure the inclination of the antenna 102 with higher accuracy.

Furthermore, in a case where the measuring device 10 according to the present embodiment is mounted on a device together with another measuring instrument for measuring the inclination of the antenna 102, a more accurate measurement result of the inclination of the antenna 102 can be obtained by making the measurement result from the measuring device 10 and the measurement result from the other measuring instrument complement each other.

4. Application Example of Embodiment of Present Disclosure

Figure 10:
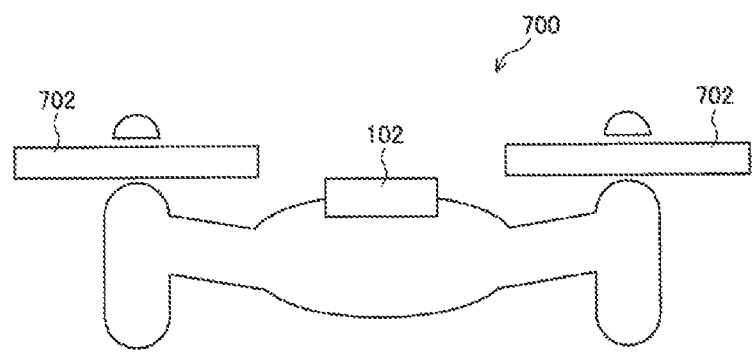
FIG. 10 is a schematic diagram of the appearance of a drone 700 according to the embodiment of the present disclosure.
Figure 11:
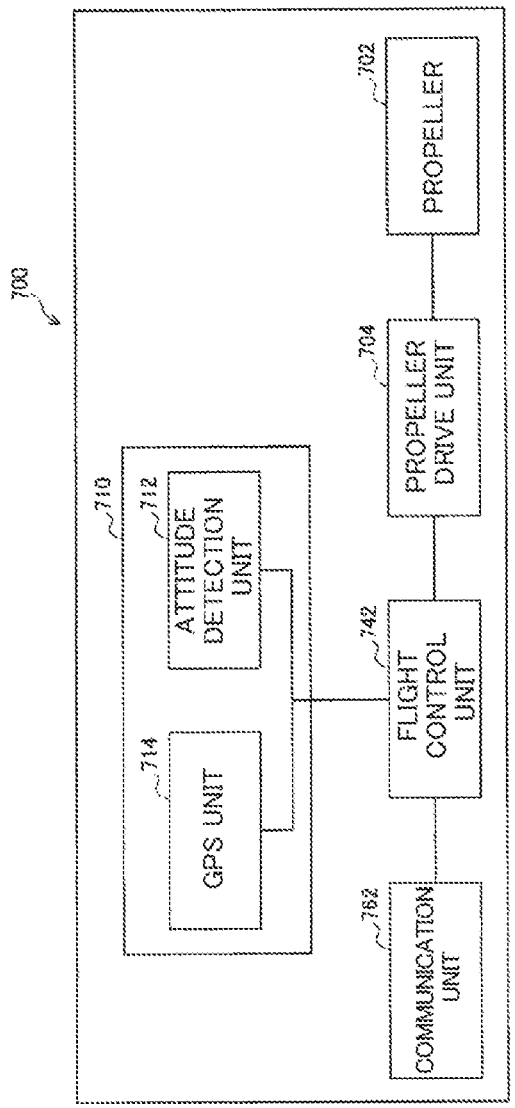
FIG. 11 is a block diagram of the drone 700 according to the embodiment of the present disclosure.

The measuring device 10 according to the embodiment of the present disclosure described above can be mounted on a drone 700, for example. Hereinafter, as an application example of the embodiment of the present disclosure, an example of the drone 700 on which the measuring device 10 according to the present embodiment is mounted will be described with reference to FIGS. 10 and 11. FIG. 10 is a schematic diagram of the appearance of the drone 700 according to the embodiment of the present disclosure, and particularly, is a schematic diagram of the drone 700 as viewed from the front. FIG. 11 is a block diagram of the drone 700.

The drone 700 is an unmanned small airplane, and can fly by an autonomous flight function, an independent attitude control function, and the like. The drone 700 mainly includes an antenna 102, a propeller 702, a propeller drive unit 704, a positioning unit 710, a flight control unit 742, and a communication unit 762. Each functional unit of the drone 700 will be described below.

(Antenna 102)

The antenna 102 is provided on an upper part of the drone 700 as illustrated in FIG. 10, and can be the antenna 102 according to the embodiment of the present disclosure described above.

(Propeller 702 and Propeller Drive Unit 704)

As illustrated in FIG. 10, a plurality of propellers 702 are provided on an upper part of the drone 700, and rotate with a power transmitted from the propeller drive unit 704 provided inside the drone 700 to apply propulsive force to the drone 700 and to maintain a horizontal attitude of the drone 700. Further, the propeller drive unit 704 is provided inside the drone 700, and rotates each propeller 702 according to the control from the flight control unit 742, which will be described later.

(Positioning Unit 710)

The positioning unit 710 is provided inside the drone 700, acquires two-dimensional position information (longitude information and latitude information) and altitude information which are position information of the drone 700, and attitude information and acceleration information of the drone 700, and outputs them to the flight control unit 742, which will be described below. Note that in the following description, the two-dimensional position information and the altitude information are collectively referred to as positional information. The output positional information, attitude information, and the like are used to fly the drone 700 to a desired location and maintain the drone 700 in a horizontal attitude.

As illustrated in FIG. 11, the positioning unit 710 mainly includes an attitude detection unit 712 and a GPS unit 714. Particularly, the attitude detection unit 712 can be the measurement unit 100 according to the embodiment of the present disclosure described above. Further, the GPS unit 714 can be the GNSS receiver 104 according to the embodiment of the present disclosure described above. Note that in the present embodiment, if it is difficult for the GPS unit 714 to acquire altitude information with sufficient accuracy, the drone 700 may include an altimeter (not illustrated) that can acquire the altitude information (height from the ground surface) of the drone 700.

(Flight Control Unit 742)

The flight control unit 742 is mainly composed of hardware provided inside the drone 700, such as a CPU (Central Processing Unit), a ROM (Read Only Memory), and a RAM (Random Access Memory), and controls the propeller drive unit 704 while using the positional information, the attitude information, and the like acquired by the positioning unit 710 described above.

(Communication Unit 762)

The communication unit 762 is provided inside the drone 700, and can communicate with a controller (not illustrated) held by an operator who remotely operates the drone 700.

Furthermore, the drone 700 includes a built-in battery (not illustrated) as a power source.

Note that the drone 700 according to the embodiment of the present disclosure is not limited to the form illustrated in FIGS. 10 and 11. For example, the drone 700 may further include an acceleration sensor (not illustrated), a gyro sensor (not illustrated), and the like if the measurement accuracy is insufficient.

Note that the measuring device 10 according to the embodiment of the present disclosure is not limited to being mounted on the drone 700 as described above, and may be mounted on various mobile devices such as an automatic mobile robot and an automobile, for example.

5. Hardware Configuration

Figure 12:
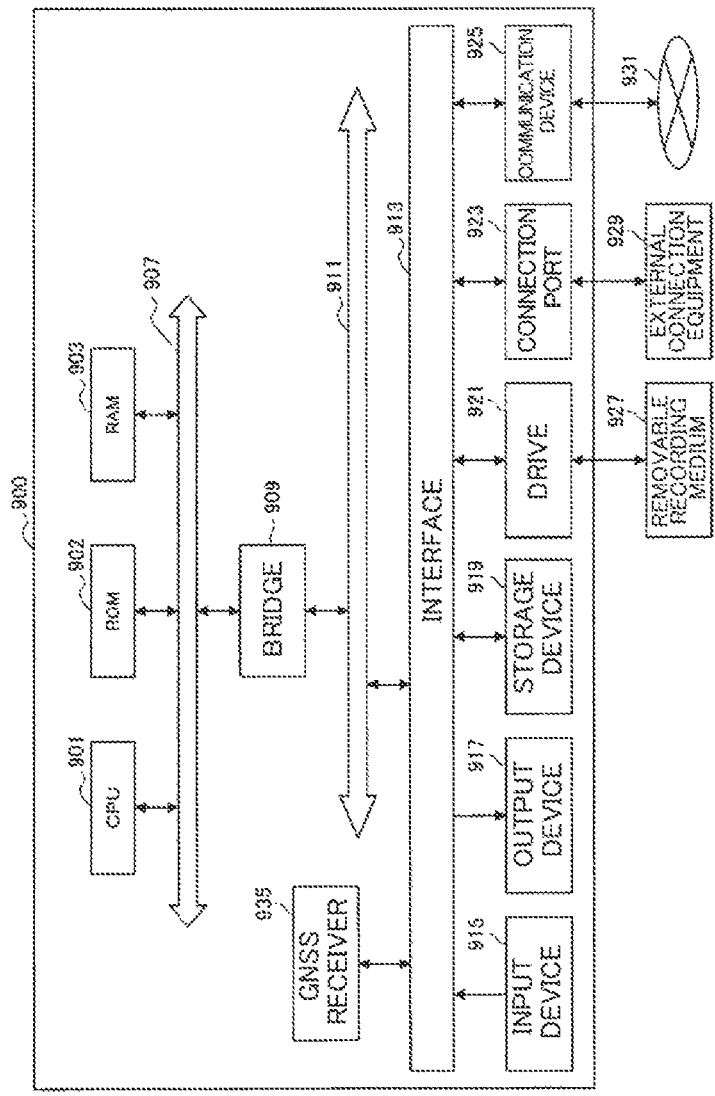
FIG. 12 is a block diagram for explaining the hardware configuration of an information processing device 900 according to the embodiment of the present disclosure.

Next, an example of the hardware configuration of an information processing device 900 according to the embodiment of the present disclosure will be described with reference to FIG. 12. FIG. 12 is a block diagram for explaining the hardware configuration of the information processing device 900 according to the embodiment of the present disclosure. The information processing device 900 illustrated is composed of, for example, a computer or the like, and can realize the measurement unit 100 in the above-described embodiment.

The information processing device 900 includes a CPU 901, a ROM 902, and a RAM 903. Further, the information processing device 900 may include a host bus 907, a bridge 909, an external bus 911, an interface 913, an input device 915, an output device 917, a storage device 919, a drive 921, a connection port 923, and a communication device 925. Further, the information processing device 900 may include a GNSS receiver 935. The information processing device 900 may include a processing circuit such as a DSP (Digital Signal Processor) in place of or in combination with the CPU 901.

The CPU 901 functions as an arithmetic processing device and a control device, and controls all or a part of the operation in the information processing device 900 according to various programs recorded in the ROM 902, the RAM 903, the storage device 919, or a removable recording medium 927. The ROM 902 stores programs, calculation parameters, and the like used by the CPU 901. The RAM 903 primarily stores programs used when the CPU 901 executes, parameters that change appropriately during that execution, and the like. The CPU 901, ROM 902, and RAM 903 are connected to each other by the host bus 907 composed of an internal bus such as a CPU bus. Furthermore, the host bus 907 is connected to the external bus 911 such as a PCI (Peripheral Component Interconnect/Interface) bus via the bridge 909.

The input device 915 is a device operated by a user, such as a button, a touch panel, and a mouse. The input device 915 includes an input control circuit that generates an input signal based on information input by the user and outputs the input signal to the CPU 901. The user can operate the input device 915 to input various data and instruct a processing operation to the information processing device 900.

The output device 917 may be, for example, a display device such as an organic EL (Electro Luminescence) display, an audio output device such as a speaker, or the like.

The storage device 919 is a data storage device configured as an example of a storage unit of the information processing device 900. The storage device 919 is composed of, for example, a semiconductor storage device or the like. The storage device 919 stores programs executed by the CPU 901, various data, various data acquired from the outside, and the like.

The drive 921 is a reader/writer for the removable recording medium 927 such as a magnetic disk, an optical disk, or a semiconductor memory, and is built in or externally attached to the information processing device 900. The drive 921 reads out information recorded in the removable recording medium 927 inserted thereinto and outputs the information to the RAM 903. Further, the drive 921 writes a record to the removable recording medium 927 inserted thereinto.

The connection port 923 is a port for directly connecting equipment to the information processing device 900. The connection port 923 can be, for example, a USB (Universal Serial Bus) port, an IEEE1394 port, a SCSI (Small Computer System Interface) port, or the like. Further, the connection port 923 may be an RS-232C port, an optical audio terminal, an HDMI (registered trademark) (High-Definition Multimedia Interface) port, or the like. Connecting external connection equipment 929 to the connection port 923 makes it possible to exchange various data between the information processing device 900 and the external connection equipment 929.

The communication device 925 is a communication interface composed of, for example, a communication device for connecting to a communication network 931. The communication device 925 may be, for example, a communication card for a wired or wireless LAN (Local Area Network), Bluetooth (registered trademark), WUSB (wireless USB), or the like. Further, the communication device 925 may be a router for optical communication, a router for ADSL (Asymmetric Digital Subscriber Line), a modem for various communications, or the like. The communication device 925 transmits and receives signals and the like to and from the Internet and other communication devices by using a predetermined protocol such as TCP/IP. Further, the communication network 931 connected to the communication device 925 is a network connected by wire or wirelessly, and is, for example, the Internet, a home LAN, infrared communication, satellite communication, or the like.

The GNSS receiver 935 can be, for example, the GNSS receiver 104 included in the measuring device 10 described above.

The example of the hardware configuration of the information processing device 900 is described above. Each of the above-mentioned components may be configured by using general-purpose members, or may be configured by hardware specialized for the function of each component. Such a configuration can be appropriately changed depending on the technical level at the time of implementation. For example, the whole or a part of the measurement unit 100 according to the embodiment of the present disclosure may be configured as a circuit mounted on one chip as described above, or may be configured as a plurality of information processing devices 900.

6. Supplement

Note that the measuring method according to the embodiment of the present disclosure described above may be implemented by, for example, a program of the measuring method executed by the device, the circuit or the system as described above, a program for operating the measurement device, and a non-transitory tangible medium on the program is recorded. Further, such a program may be distributed via a communication line (including wireless communication) such as the Internet.

Further, each step in the measuring method of the embodiment of the present disclosure described above does not necessarily have to be processed in the order as described. For example, each step may be processed in a different order as appropriate. Further, each step may be partially processed in parallel or individually instead of being processed in chronological order. Furthermore, the processing of each step does not necessarily have to be processed according to the described method, and may be processed by, for example, another method by another functional unit.

Although the preferred embodiments of the present disclosure are described in detail above with reference to the accompanying drawings, the technical scope of the present disclosure is not limited to such examples. It should be understood that it is obvious for a person having ordinary skill in the art of the present disclosure to conceive of various changes or modifications within the scope of the technical ideas set forth in the claims, and such changes or modifications also fall within the technical scope of the present disclosure.

Further, the advantageous effects described herein are merely explanatory or exemplary and are not limited. In other words, the techniques according to the present disclosure may exhibit other advantageous effects apparent to those skilled in the art from the description herein, in addition to or in place of the above advantageous effects.

Note that the following configurations also fall within the technical scope of the present disclosure.

(1)

A measuring circuit including a reception strength acquisition unit that acquires reception strengths of received signals received from respective transmitting stations by an antenna having a predetermined directivity;

a direction component information acquisition unit that acquires azimuth angle information and elevation angle information, obtained from each of the received signals with respect to a position of the antenna used as a reference, of the each of the transmitting stations;

a pattern generation unit that maps a three-dimensional vector of the azimuth angle information, the elevation angle information, and the reception strength of each of the received signals to a virtual three-dimensional space with the antenna being an origin to generate a first reception strength pattern; and a comparison unit that compares the generated first reception strength pattern with a second reception strength pattern that is a known reception strength pattern to acquire an inclination of the antenna.

(2)

The measuring circuit according to (1), wherein the pattern generation unit maps the three-dimensional vector by determining a direction component of the three-dimensional vector based on the azimuth angle information and the elevation angle information, and determining a scalar component of the three-dimensional vector based on the reception strength.

(3)

The measuring circuit according to (2), further including a normalization unit that normalizes the reception strength of each of the received signals based on the information obtained from each of the received signals, wherein the pattern generation unit maps the three-dimensional vector by determining a scalar component of the three-dimensional vector based on the normalized reception strength.

(4)

The measuring circuit according to (3), wherein the normalization unit normalizes the reception strength by using distance information from the antenna to each of the transmitting stations.

(5)

The measuring circuit according to (4), wherein the normalization unit normalizes the reception strength by using the elevation angle information.

(6)

The measuring circuit according to (3), wherein the normalization unit normalizes the reception strength by using transmission output information of the transmitting station.

(7)

The measuring circuit according to any one of (1) to (6), further including;

an extraction unit that extracts a feature of the first reception strength pattern; and a storage unit that stores a feature of the second reception strength pattern, wherein the comparison unit acquires an inclination of the antenna based on a difference between the feature of the first reception strength pattern and the feature of the second reception strength pattern.

(8)

The measuring circuit according to (7), wherein the extraction unit extracts an axis of the first reception strength pattern as the feature, and the comparison unit acquires the inclination of the antenna by calculating an angle of the axis of the first reception strength pattern with respect to an axis of the second reception strength pattern.

(9)

The measuring circuit according to (8), wherein the extraction unit extracts the axis of the first reception strength pattern by fitting the first reception strength pattern to a predetermined model pattern.

(10)

The measuring circuit according to (8) or (9), wherein the comparison unit acquires the inclination of the antenna by performing pattern matching between the first reception strength pattern and the second reception strength pattern.

(11)

The measuring circuit according to (10), wherein the comparison unit rotates one of the first and second reception strength patterns to match the other, and acquires the inclination of the antenna based on a rotation angle of the axis of one of the matched patterns.

(12)

The measuring circuit according to any one of (1) to (11), wherein the second reception strength pattern is a reception strength pattern obtained in a state where the antenna is installed at a known inclination.

(13)

The measuring circuit according to any one of (1) to (11), wherein the second reception strength pattern is defined based on a radiation power pattern of the antenna.

(14)

The measuring circuit according to any one of (1) to (13), wherein the antenna is a patch antenna or a chip antenna.

(15)

The measuring circuit according to any one of (1) to (14), wherein the transmitting station is a GNSS satellite.

(16)

A measuring device including:

an antenna having a predetermined directivity;

a reception strength acquisition unit that acquires reception strengths of received signals received from respective transmitting stations by the antenna;

a direction component information acquisition unit that acquires azimuth angle information and elevation angle information, obtained from each of the received signals with respect to a position of the antenna used as a reference, of the each of the transmitting stations;

a pattern generation unit that maps a three-dimensional vector of the azimuth angle information, the elevation angle information, and the reception strength of each of the received signals to a virtual three-dimensional space with the antenna being an origin to generate a first reception strength pattern; and a comparison unit that compares the generated first reception strength pattern with a second reception strength pattern that is a known reception strength pattern to acquire an inclination of the antenna.

(17)

A program for causing a computer to implement:

a function of acquiring reception strengths of received signals received from respective transmitting stations by an antenna having a predetermined directivity;

a function of acquiring azimuth angle information and elevation angle information, obtained from each of the received signals with respect to a position of the antenna used as a reference, of the each of the transmitting stations;

a function of mapping a three-dimensional vector of the azimuth angle information, the elevation angle information, and the reception strength of each of the received signals to a virtual three-dimensional space with the antenna being an origin to generate a first reception strength pattern; and a function of comparing the generated first reception strength pattern with a second reception strength pattern that is a known reception strength pattern to acquire an inclination of the antenna.

REFERENCE SIGNS LIST

10 Measuring device
100 Measurement unit
102 Antenna
104, 935 GNSS receiver
112 Elevation angle and azimuth angle input unit
114 Reception strength input unit
116 Satellite-specific transmission output table
118 Reception strength normalization processing unit
120 Pattern generation unit
122 Pattern feature extraction unit
124 Feature output unit
126 Horizontal pattern feature data
128 Pattern feature comparison unit
130 Result output unit
200, 200a, 200b, 200c, 200d, 200e GNSS satellite
300, 300a, 300b, 300c, 300d Reception strength vector
304, 304a Elevation angle
400, 400a, 400b Reception strength pattern
402 Angle
700 Drone
702 Propeller
704 Propeller drive unit
710 Positioning unit
712 Attitude detection unit
714 GPS unit
742 Flight control unit
762 Communication unit
800 Shield
900 Information processing device
901 CPU
902 ROM
903 RAM
907 Host bus
909 Bridge
911 External bus
913 Interface
915 Input device
917 Output device
919 Storage device
921 Drive
923 Connection port
925 Communication device 927 Removable recording medium
929 External connection equipment

The invention claimed is:

1. A measuring circuit, comprising:
a reception strength acquisition unit configured to acquire reception strengths of received signals received from respective transmitting stations by an antenna that have a specific directivity;
a direction component information acquisition unit configured to acquire azimuth angle information and elevation angle information, from each of the received signals with respect to a position of the antenna used as a reference, of the each of the transmitting stations;
a pattern generation unit configured to map a three-dimensional vector of the azimuth angle information, the elevation angle information, and the reception strength of each of the received signals to a virtual three-dimensional space with the antenna being an origin to generate a first reception strength pattern; and
a comparison unit configured to compare the generated first reception strength pattern with a second reception strength pattern that is a specific reception strength pattern to acquire an inclination of the antenna.

2. The measuring circuit according to claim 1, wherein the pattern generation unit is further configured to map the three-dimensional vector based on determination of a direction component of the three-dimensional vector based on the azimuth angle information and the elevation angle information, and determine a scalar component of the three-dimensional vector based on the reception strength.

3. The measuring circuit according to claim 2, further comprising
a normalization unit configured to normalize the reception strength of each of the received signals based on the information from each of the received signals, wherein
the pattern generation unit is further is configured to map the three-dimensional vector based on determination of a scalar component of the three-dimensional vector based on the normalized reception strength.

4. The measuring circuit according to claim 3, wherein the normalization unit is further is configured to
normalize the reception strength based on distance information from the antenna to each of the transmitting stations.

5. The measuring circuit according to claim 4, wherein the normalization unit is further is configured to
normalize the reception strength based on the elevation angle information.

6. The measuring circuit according to claim 3, wherein the normalization unit is further is configured to
normalize the reception strength based on transmission output information of the transmitting station.

7. The measuring circuit according to claim 1, further comprising:
an extraction unit configured to extract a feature of the first reception strength pattern; and
a storage unit configured to store a feature of the second reception strength pattern, wherein
the comparison unit is further configured to acquire an inclination of the antenna based on a difference between the feature of the first reception strength pattern and the feature of the second reception strength pattern.

8. The measuring circuit according to claim 7, wherein the extraction unit is further configured to extract an axis of the first reception strength pattern as the feature, and the comparison unit is further configured to acquire the inclination of the antenna by calculating an angle of the axis of the first reception strength pattern with respect to an axis of the second reception strength pattern.

9. The measuring circuit according to claim 8, wherein the extraction unit is further configured to:
fit the first reception strength pattern to a specific model pattern, and
extract the axis of the first reception strength pattern based on the fitted first reception strength pattern.

10. The measuring circuit according to claim 8, wherein the comparison unit is further configured to acquire the inclination of the antenna by performing pattern matching between the first reception strength pattern and the second reception strength pattern.

11. The measuring circuit according to claim 10, wherein the comparison unit is further configured to rotate one of the first and second reception strength patterns to match the other, and acquires the inclination of the antenna based on a rotation angle of the axis of one of the matched patterns.

12. The measuring circuit according to claim 1, wherein the second reception strength pattern is a reception strength pattern in a state where the antenna is installed at a specific inclination.

13. The measuring circuit according to claim 1, wherein the second reception strength pattern is defined based on a radiation power pattern of the antenna.

14. The measuring circuit according to claim 1, wherein the antenna is one of a patch antenna or a chip antenna.

15. The measuring circuit according to claim 1, wherein the transmitting station is a GNSS satellite.

16. A measuring device, comprising:
an antenna that have a specific directivity;
a reception strength acquisition unit configured to acquire reception strengths of received signals received from respective transmitting stations by the antenna;
a direction component information acquisition unit configured to acquire azimuth angle information and elevation angle information, from each of the received signals with respect to a position of the antenna used as a reference, of the each of the transmitting stations;
a pattern generation unit configured to map a three-dimensional vector of the azimuth angle information, the elevation angle information, and the reception strength of each of the received signals to a virtual three-dimensional space with the antenna being an origin to generate a first reception strength pattern; and
a comparison unit configured to compare the generated first reception strength pattern with a second reception strength pattern that is a specific reception strength pattern to acquire an inclination of the antenna.

17. A non-transitory computer-readable medium having stored thereon, computer-executable instructions which, when executed by a computer, cause the computer to execute operations, the operations comprising:
acquiring reception strengths of received signals received from respective transmitting stations by an antenna that have a specific directivity;
acquiring azimuth angle information and elevation angle information, from each of the received signals with respect to a position of the antenna used as a reference, of the each of the transmitting stations;
mapping a three-dimensional vector of the azimuth angle information, the elevation angle information, and the reception strength of each of the received signals to a virtual three-dimensional space with the antenna being an origin to generate a first reception strength pattern; and comparing the generated first reception strength pattern with a second reception strength pattern that is a reception strength pattern to acquire an inclination of the antenna.

\* \* \* \* \*